(12) United States Patent
Sahara

(10) Patent No.: US 6,205,613 B1
(45) Date of Patent: Mar. 27, 2001

(54) WIPER APPARATUS WITH RISE-UP MECHANISM

(75) Inventor: Hideshi Sahara, Toyohashi (JP)

(73) Assignee: Asmo Co., Ltd, Shizuoka-ken (JP)

( * ) Notice: Subject to any disclaimer, the term of this patent is extended or adjusted under 35 U.S.C. 154(b) by 0 days.

(21) Appl. No.: 09/261,719

(22) Filed: Mar. 3, 1999

(30) Foreign Application Priority Data

Mar. 4, 1998 (JP) .................................................. 10-069572

(51) Int. Cl.⁷ .................................. B60S 1/18; B60S 1/24; F16H 21/42
(52) U.S. Cl. ................................ 15/250.16; 74/70; 74/75; 74/600
(58) Field of Search .......................... 15/250.16, 250.17, 15/250.19, 250.13, 250.3, 250.31; 74/42, 600, 601, 52, 70, 75

(56) References Cited

U.S. PATENT DOCUMENTS

| | | | | |
|---|---|---|---|---|
| 3,665,772 | * | 5/1972 | Beard et al. ........................ | 15/250.27 |
| 4,686,733 | * | 8/1987 | Sahara ................................ | 15/250.16 |
| 4,916,774 | | 4/1990 | Arlon et al. ....................... | 15/250.16 |
| 5,209,140 | | 5/1993 | Eustache et al. ....................... | 74/601 |

FOREIGN PATENT DOCUMENTS

| | | | |
|---|---|---|---|
| 2 141 021 | | 12/1984 | (GB) . |
| 2219491 | * | 12/1989 | (GB) ................................ 15/250.16 |
| 57-118957 | | 7/1982 | (JP) . |
| 60-8561 | | 1/1985 | (JP) . |
| 1-309852 | | 12/1989 | (JP) . |
| 3-25055 | | 2/1991 | (JP) . |
| 7-165021 | | 6/1995 | (JP) . |

\* cited by examiner

*Primary Examiner*—Gary K. Graham
(74) *Attorney, Agent, or Firm*—Crompton, Seager & Tufte, LLC

(57) ABSTRACT

A wiper with rise-up mechanism includes a crank and a rod that is rotatably connected to the crank through a shift mechanism. The crank supports an eccentric rotor. The rod is coupled to the eccentric rotor to rotate about the axis of the eccentric rotor. A key is supported in the eccentric rotor to move axially. The key can be moved by the rotation of the crank. When the crank rotates in a normal direction, the key locks the eccentric rotor to the rod. When the crank rotates in the reverse direction, the key fixes the eccentric rotor to the crank. Only one key is used, which reduces the number of parts and simplifies the operation of the key.

20 Claims, 11 Drawing Sheets

WIPER APPARATUS WITH RISE-UP MECHANISM

BACKGROUND OF THE INVENTION

The present invention relates to a wiper apparatus for wiping the windows of vehicles. More specifically, the present invention relates to a wiper apparatus having a rise-up mechanism.

There are wipers that have so called rise-up mechanism. In such wipers, wiper blades are stored below their wiping range when not operating so that the visibility of a driver is improved. When the wiper is operating, the wiper blades move into the wiping range and pivot in the range.

Japanese Unexamined Patent Publication NO. 7-165021 describes such a wiper. As shown in FIG. 13, the wiper includes a crank 301, which is rotated by a motor 300. The proximal end of a connecting rod 303 is connected to the distal end of the crank 301 through a shifting mechanism 302. A wiper arm 305 is connected to the distal end of the connecting rod 303 through a link lever 304 at a connecting point. The link lever 304 and the wiper arm 305 integrally pivot about the connecting point. A wiper blade 306 is supported on the wiper arm 305.

When the crank 301 is rotated by the motor 300, rotation of the crank 301 is converted to pivotal movement of the link lever 304 by the connecting rod 303. When the link lever 304 pivots, the wiper blade 306 pivots with the wiper arm 305.

A shaft 307 is provided in the distal end of the crank 301. The shifting mechanism 302 includes an eccentric rotor 308 that is eccentrically rotatable about the shaft 307. The center axis N of the eccentric rotor 308 is offset by a distance H with respect to the shaft 307. The connecting rod 303 is rotatably connected about the axis N of the eccentric rotor 308. The shifting mechanism 302 further includes a first key for fixing the eccentric rotor 308 to the crank 301 and a second key for fixing the eccentric rotor 308 to the connecting rod 303.

When the wiper is not operating, the crank 301 is in an outer position A, the eccentric rotor 308 is positioned as shown by the broken circle A1 in FIG. 13, the second key is released, which permits the connecting rod 303 to rotate with respect to the eccentric rotor 308, and the first key locks the eccentric rotor 308 to the crank 301. The eccentric rotor 308 A5 is fixed to the crank 301 in the position indicated by the broken circle A1. Therefore, the axis N of the eccentric rotor 308 is located on the longitudinal axis of the crank 301 and on an outer side of the shaft 307. In this state, the connecting point between the connecting rod 303 and the link lever 304 is positioned at an upper location A1'. Therefore, the wiper blade 306 is positioned at a lower location A1", which is below a predetermined wiping range R.

When the wiper starts operating, the motor 300 rotates the crank 301 from the position A counterclockwise in FIG. 13. While the crank 301 rotates from the position A to a position C via a position B, the position of the eccentric rotor 308 with respect to the crank 301 is retained. The path of the axis N of the eccentric rotor 308 is shown by the broken line L1. At the same time, the connecting rod 303 rotates about the axis N of the eccentric rotor 308 with respect to the eccentric rotor 308. While the axis N of the eccentric rotor 308 moves on the path L1, the connecting point between the connecting rod 303 and the link lever 304 moves from the position A1' to the position C'. Simultaneously, the wiper blade 306 moves from the storage position A1" to an upper position C of the wiping range R.

When the crank 301 passes the position C, the eccentric rotor 308 is released from the crank 301 by unlocking the first key, and the second key is locked to fix the eccentric rotor 301 to the connecting rod 303. From then on, as long as the crank 301 rotates counterclockwise, the state of the keys does not change. Accordingly, as the crank 301 rotates counterclockwise, the eccentric rotor 308 integrally rotates with the connecting rod 303 about the shaft 307 with respect to the crank 301. A solid-line path L2 shows the movement of the axis N of the eccentric rotor 308.

When the crank 301 reaches the position A again, after one rotation, the eccentric rotor 308 is positioned with respect to the crank 301 at an inner position A2 as shown by a solid-line circle. In this state, compared to the inoperative position A1 indicated by the broken circle, the axis N of the eccentric rotor 308 is offset by a distance 2 H toward the axis of the crank 301. Therefore, the proximal end of the connecting rod 303 is closer to the link lever 304 by the distance 2 H. As a result, the connecting point between the connecting rod 303 and the link lever 304 reverses direction at a limit position A2'. Thus, the wiper blade 306 reverses direction at a corresponding limit position A2" of the wiping range R.

While the crank 301 initially rotates from the position A to the position C as described above, the axis N of the eccentric rotor 308 moves on the broken-line path L1. From then on, as long as the crank 301 rotates counterclockwise, the axis N of the eccentric rotor 308 moves on the solid-line path L2. Accordingly, once the wiper blade 306 moves from the storage position A1" into the wiping range R, the wiper blade 306 swings between the lower position A2" and the upper end position C" of the wiping range R as long as the wiper is operating.

When the wiper is stopped, after reaching the position A, the crank 301 returns to the position A after making one rotation in the reverse direction, or clockwise in FIG. 13. While the crank 301 makes the one clockwise rotation, the initial movement described earlier is reversed. That is, when the crank 301 passes through the position C, the eccentric rotor 308 is released from the connecting rod 303 by the second key, and the first key locks the eccentric rotor 308 to the crank 301. Accordingly, while the crank 301 rotates from the position C to the position A via position B, the axis N of the eccentric rotor 308 moves along the path L1. Therefore, the wiper blade 306 moves from the upper position C" of the wiping range R to the storage position A1".

In the prior art wiper, the operation of the two keys locks the eccentric rotor 308 to the crank 301 or to the connecting rod 303. This change moves the wiper blade 306 between the lower limit position of the wiping range R and the storage position A1".

However, the two keys increase the number of parts and complicate the structure. Complexity increases the cost of manufacturing and lowers reliability.

SUMMARY OF THE INVENTION

The objective of the present invention is to provide a simple and inexpensive wiper with reliable operation.

To achieve the above objective, the present invention provides a wiper mechanism including a crank, a rod and a joint. The crank is rotatable about a crank axis. The rod transmits motion from the crank to a wiper arm, which supports a wiper blade. The rod has a crank end and a wiper end. The crank end is connected to the crank. The axis about which the crank end of the rod pivots is a rod pivot axis. The joint is located between the crank and the rod. The joint includes a shift mechanism for changing the axis about which the rod pivots with respect to the crank. The shift mechanism includes a shaft, an eccentric rotor and a key. The shaft is supported by the crank. The axis of the shaft is parallel to the crank axis. The eccentric rotor is supported on the shaft to eccentrically rotate about the axis of the shaft. The eccentric rotor has a center axis that is offset from the axis of the shaft. The key selectively locks either the crank or the rod to the eccentric rotor. The key is operated by the rotation of the crank. The key locks the eccentric rotor to one of the crank and the rod when the crank rotates in a first direction. The key locks the eccentric rotor to the other one of the crank and the rod when the crank rotates in a second direction, which is opposite to the first direction. The axis of rotation between the rod and the crank coincides with the axis of the shaft when the eccentric rotor is locked to the rod. The axis of rotation between the rod and the crank coincides with the center axis of the eccentric rotor when the eccentric rotor is locked to the crank.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1(*b*) is a partial cross-sectional view showing the eccentric rotor fixed to a connecting rod;

FIG. 4(*b*) is a cross-sectional view showing a state in which the shutter plate has been rotated 180 degrees with respect to the connecting plate, compared to the state in FIG. 4(*a*);

FIG. 6(*b*) shows a state of the crank after making a rotation from the state in FIG. 6(*a*);

DETAILED DESCRIPTION OF THE PREFERRED EMBODIMENTS

Figure 1:
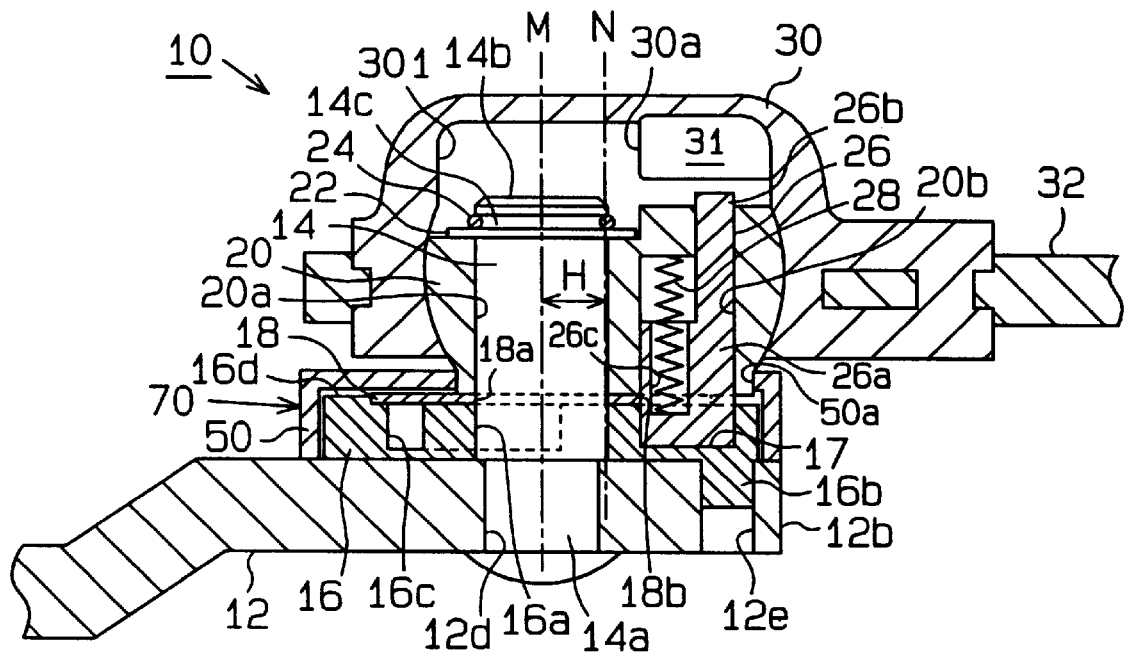
FIG. 1(*a*) is a partial cross-sectional view of a wiper according to a first embodiment of the present invention, showing an eccentric rotor fixed to a crank.
Figure 1:
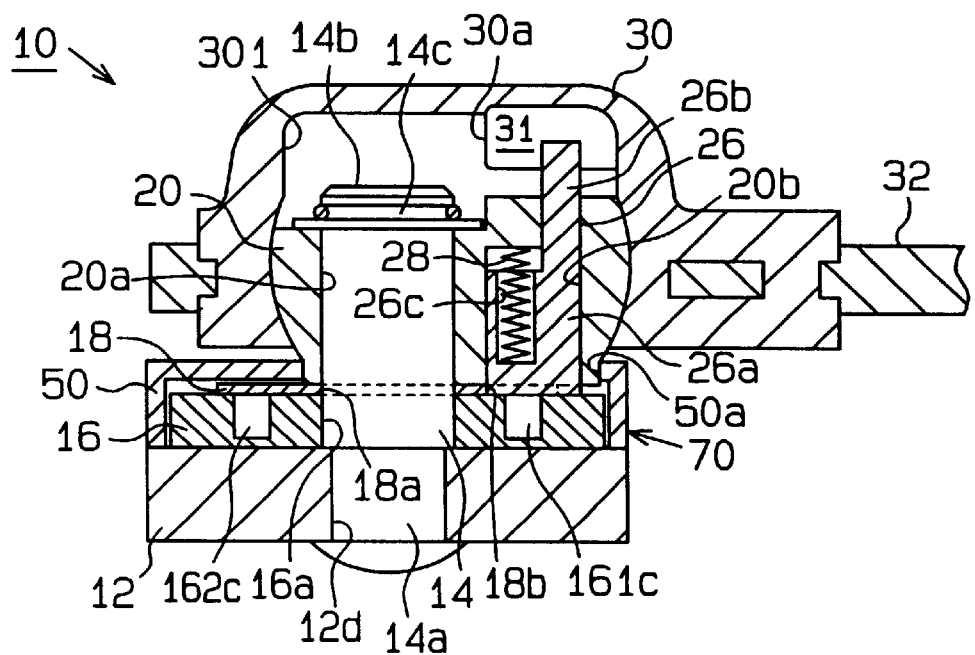

A wiper according to a first embodiment of the present invention will now be described in reference to the drawings. The terms "above", "below", "upper" and "lower" are sometimes used in the following description to refer to directions as depicted in the drawings, and not as the device is actually oriented when in use. As shown in FIGS. 1(*a*), 1(*b*) and 2, the wiper mechanism 10 includes a motor 60, which is rotatable both clockwise and counterclockwise, and a plate-type crank 12, which is fixed to a rotation shaft 61 of the motor 60. A hole 12*c* for receiving the shaft 61 is formed in the proximal end 12*a* of the crank 12. The motor 60 rotates the crank 12 about the hole 12*c*. The proximal end of a connecting rod 32 is connected to the distal end 12*b* of the crank 12 through a shifting mechanism 70.

Figure 10:
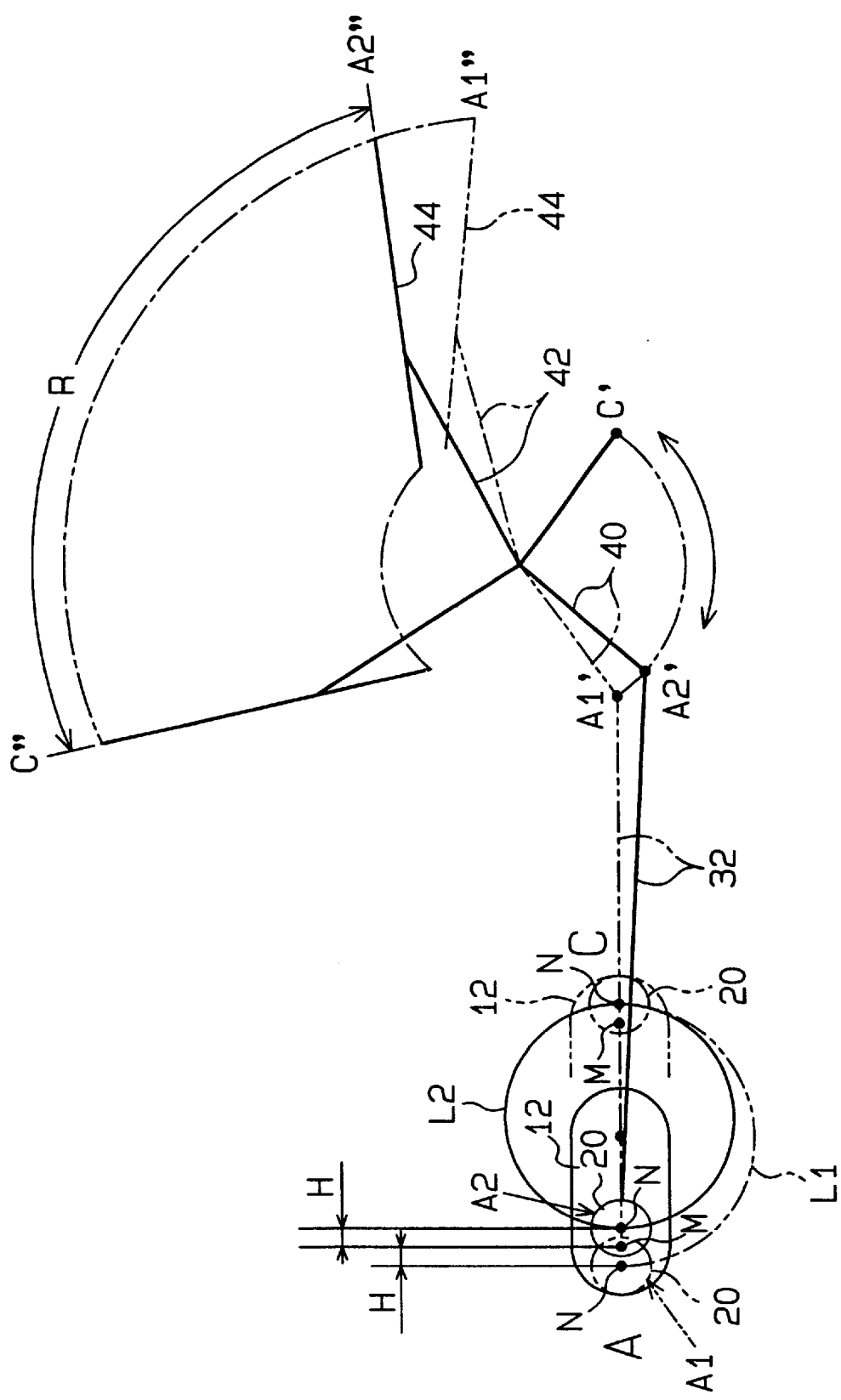
FIG. 10 is a motion diagram of the wiper mechanism.
Figure 13:
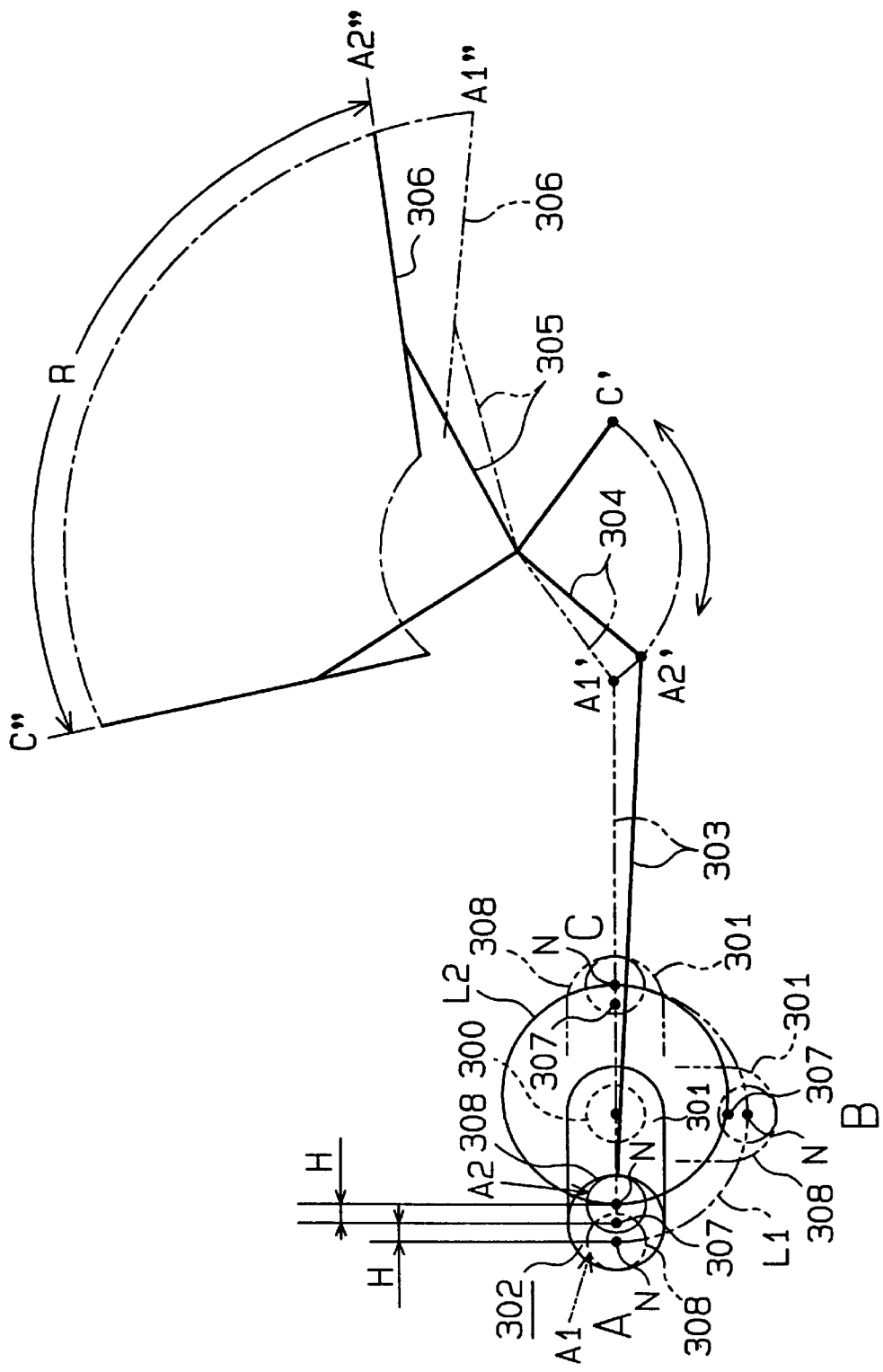
FIG. 13 is a motion diagram of a prior art wiper.

FIG. 10 shows the whole wiper mechanism 10. The basic structure and operation of the wiper mechanism 10 is substantially the same as those of the prior art wiper shown in FIG. 13. A wiper arm 42 is connected to the distal end of the connecting rod 32 through a link lever 40. A wiper blade 44 is supported on the wiper arm 42. When the wiper operates, the motor 60 rotates the crank 12. Rotation of the crank 12 is converted to pivoting of the link lever 40 by the connecting rod 32. As the link lever 40 pivots, the wiper blade 44 is moved in a wiping range R by the wiper arm 42. When the wiper mechanism 10 is not operating, as shown by a broken line in FIG. 10, the wiper blade 44 is positioned at a storage position A1" below the wiping range R by the operation of a shifting mechanism 70.

Figure 2:
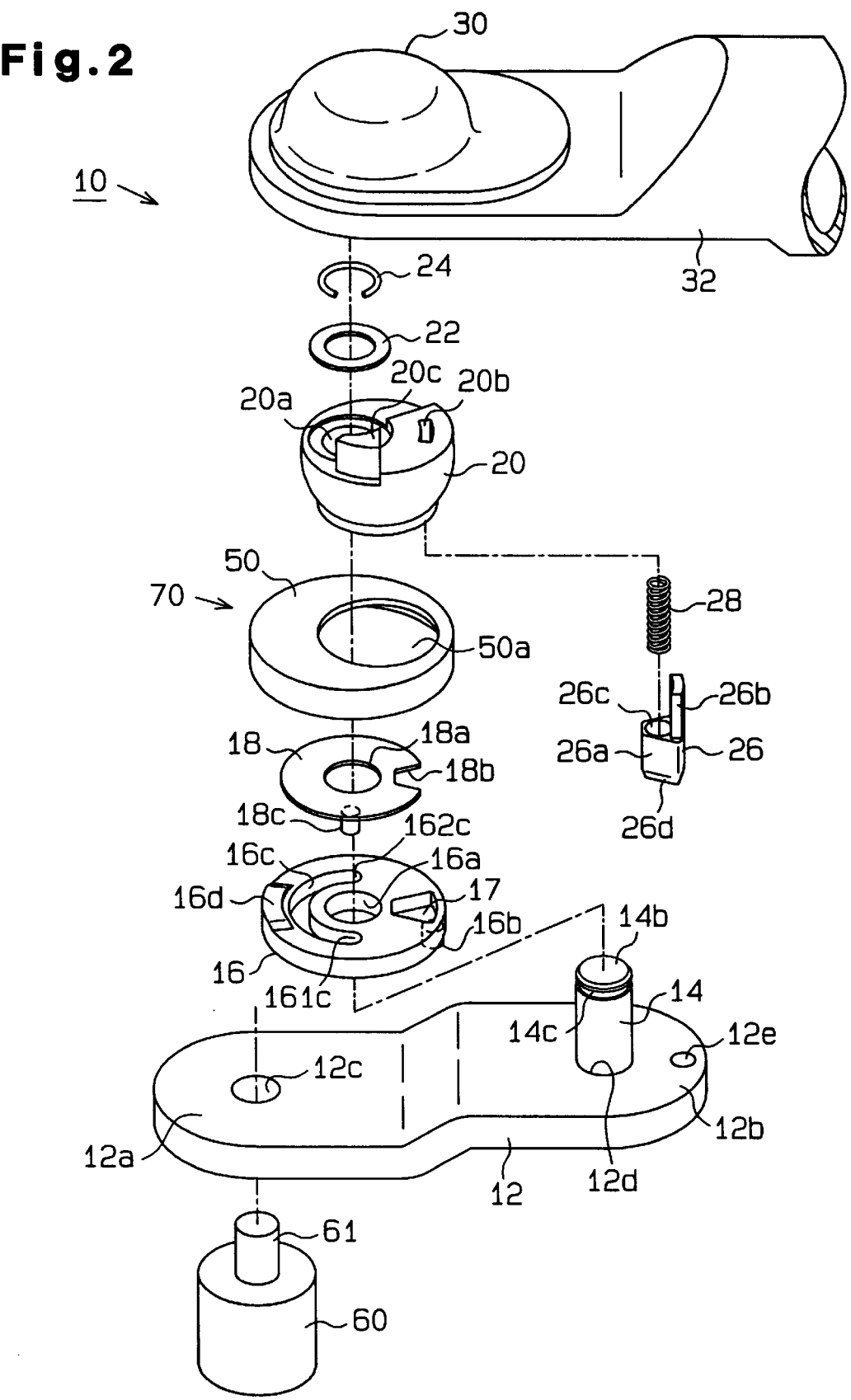
FIG. 2 is a exploded perspective view of the wiper.

The shifting mechanism 70 will now be described. As shown in FIGS. 1 and 2, the proximal end 14*a* of a shaft 14 is anchored in a hole 12*d* formed in the distal end 12*b* of the crank 12. The diameter of the anchored end portion 14*a* is smaller than the remainder of the shaft 14, and a portion that extends from the opposite side of the crank 12 is flattened to secure the shaft 14 to the hole 12*d*. The shaft 14 is parallel to the rotational axis of the crank 12. A circumferentially extending groove 14*c* is formed in the distal end 14*b* of the shaft 14.

A disk-shaped connecting plate 16 is fitted on the shaft 14. The connecting plate 16 has a through hole 16*a* for receiving the shaft 14. The connecting plate 16 further includes a projection 16*b*, which projects toward the crank 12. The projection 16*b* engages a hole 12*e*, which is formed in the crank 12. Accordingly, the connecting plate 16 is attached to the crank 12 and does not rotate about the shaft 14.

Figure 3:
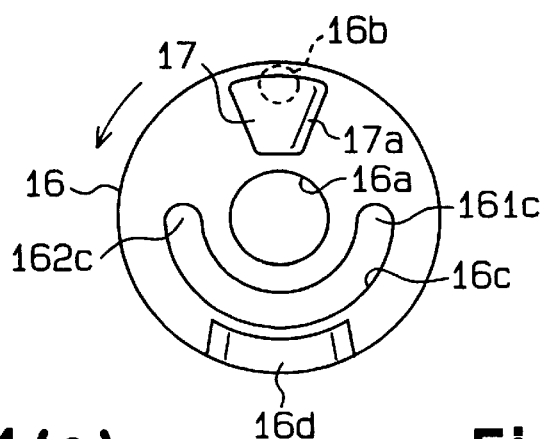
FIG. 3 is a plan view of a connecting plate.

As shown in FIGS. 2 and 3, an engagement recess 17 is formed on the connecting plate 16. The engagement recess 17 is located on the distal end side of the shaft 14, like the hole 12*e*. A side wall 17*a* of the engagement recess 17, which is clockwise from the projection 16*b* as shown in FIG. 3, is inclined in the axial direction such that the area of the opening of the recess 17 is larger than the area of its floor, or bottom. Further, a hole that passes through the plate may be formed instead of the engagement recess 17.

The connecting plate 16 includes an arc-shaped guide groove 16*c*, or slot, and a projection 16*d*, which is diametrically opposed to the recess 17. The guide groove 16*c* is concentric with the through hole 16*a* and extends about 180 degrees of the connecting plate 16. The projection 16*d* is located on the outer side of the guide groove 16*c* and has a circumferential length greater than that of the engagement recess 17. The end surfaces of the projection 16*d* are inclined to form ramps as seen in FIG. 2.

As shown in FIGS. 1, 2 and 4, a thin, disk-like shutter plate 18 is placed on the connecting plate 16. A through hole 18*a* receives the shaft 14 and is formed in the center of the shutter plate 18. The shutter plate 18 has a diameter smaller than that of the connecting plate 16 and is located inside the projection 16d. The diameter of the shutter plate is determined so that the shutter plate 18 covers at least part of engagement recess 17. The thickness of the shutter plate 18 is slightly greater than the axial dimension of the projection 16d.

A notch having a shape corresponding to that of the engagement recess 17 is formed on the periphery of the shutter plate 18. A projection 18c projects from the shutter plate 18 toward the connecting plate 16. The projection 18c is located in the guide groove 16c of the connecting plate 16. Accordingly, the shutter plate rotates about the shaft 14 within the limits of the guide groove 16c. In the present invention, the shutter plate 18 rotates 180 degrees with respect to the connecting plate 16. The rotational range of the shutter plate 18 may be varied.

Figure 4A:
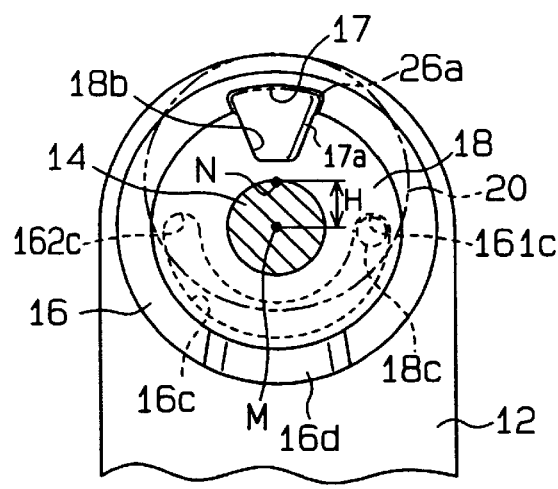
FIG. 4(*a*) is a plan view mainly showing the connecting plate and a shutter plate.

As shown in FIG. 4(a), when the projection 18c abuts a first end 161c of the guide groove 16c, the notch 18b is axially aligned with the engagement recess 17. This completely exposes the engagement recess 17. When the shutter plate 18 rotates 180 degrees clockwise (as viewed in FIG. 4(a)) from this state, with respect to the connecting plate 16, the projection 18c abuts a second end 162c of the guide groove 16c. In this state, the shutter plate 18 covers a radially inner portion of the engagement recess 17. Further, the notch 18b radially corresponds to the projection 16d.

As shown in FIGS. 1 and 2, an eccentric rotor 20 connects the crank 12 to a connecting rod 32 and is shaped generally like a truncated sphere. A through hole 20a, which receives the shaft 14, is formed at a position offset from an axis N of the eccentric rotor 20. The eccentric rotor 20 eccentrically rotates about the shaft 14. The axis N of the eccentric rotor 20 is offset by a distance H with respect to the axis M of the shaft 14.

Prior to the engagement of the eccentric rotor 20 with the shaft 14, a cover 50 is installed to cover the connecting plate 16 and the shutter plate 18. The cover 50 includes a through hole 50a for receiving the lower end of the eccentric rotor 20. The cover rotates integrally with the eccentric rotor 20 about the shaft 14. The cover 50 may be integrally formed with the eccentric rotor 20.

A washer 22 is fitted on the distal end 14b of the shaft 14, which projects above the eccentric rotor 20 through the through hole 20a. Further, a snap ring 24 is fitted in a groove 14c, which secures the connecting plate 16, the shutter plate 18, the cover 50 and the eccentric rotor 20 to the shaft 14.

A guide hole 20b extends parallel to the through hole 20a radially spaced from the through hole 20a and offset from the axis N of the eccentric rotor 20. The guide hole 20b has openings on both the upper and lower ends of the eccentric rotor 20. An engagement projection 20c is formed on the upper surface of the eccentric rotor 20 in the vicinity of the upper opening of the guide hole 20b.

As shown in FIGS. 1 and 2, a key 26 is accommodated in the guide hole 20b to move axially. The axial length of the key 26 is greater than that of the guide hole 20b. The key 26 includes a relatively thick first, or lower, body 26a and a thin second, or upper, body 26b extending from the upper surface of the lower engagement body. The lower end of the lower engagement body 26a is tapered and has an inclined surface 26d. The lower engagement body 26a extends below the lower opening of the guide hole 20b. The upper body 26b extends above the upper opening of the guide hole 20b.

A blind hole 26c is formed in the upper surface of the lower body 26a. An elastic member 28 is accommodated in the blind hole 26c. In the present invention, a coil spring is used for the elastic member 28. Other elastic members such as a rubber element may be used instead. When the key 26 is in the guide hole 20b, the coil spring 28 abuts against the inner upper surface of the guide hole 20b and urges the key 26 downward, or towards the connecting plate 16, as shown in FIGS. 1(a) and 1(b).

The engagement recess 17 of the connecting plate 16 is located on the rotational path of the lower body 26a about the shaft 14. Accordingly, as shown in FIG. 1(a) and FIG. 4(a), when the notch 18b of the shutter plate 18 is axially aligned with the engagement recess 17, the lower body 26a can enter the engagement recess 17. When the lower body 26a occupies the engagement recess 17, the eccentric rotor 20 is fixed to the connecting plate 16, and rotation of the eccentric rotor 20 about the shaft 14 is prevented. In this state, the axis N of the eccentric rotor 20 is located between the axis M and the recess 17 as shown in FIG. 4(a). At the same time, the upper body 26b occupies the guide hole 20b as shown in FIG. 1(a).

As shown in FIG. 4(a), when the projection 18c of the shutter plate 18 abuts against the first end 161c of the guide groove 16c of the connecting plate 16, the shutter plate 18 is prevented from rotating counterclockwise. Therefore, if a counterclockwise force is applied to the eccentric rotor 20, the lower body 26a, which is arranged in the engagement recess 17, engages with the side wall of the engagement recess 17 and the edge of the notch 18b and is held in the engagement recess 17. In other words, when the lower body 26a is in the engagement recess 17, counterclockwise (in FIG. 4(a)) rotation of the eccentric rotor 20 with respect to the connecting plate 16 is completely prevented.

On the other hand, when a clockwise force of a certain magnitude is applied to the eccentric rotor 20, the inclined surface 26d of the lower body 26a slides along the inclined side wall 17a of the engagement recess 17 in the manner of a cam. Therefore, the lower body 26a rises into the guide hole 20b against the force of the coil spring 28 and is thus removed from the engagement recess 17. Accordingly, clockwise rotation of the eccentric rotor 20 with respect to the connecting plate 16 is permitted. After a clockwise rotation, the upper body 26b projects from the upper surface of the eccentric rotor 20 as shown in FIG. 1(b).

Figure 4B:
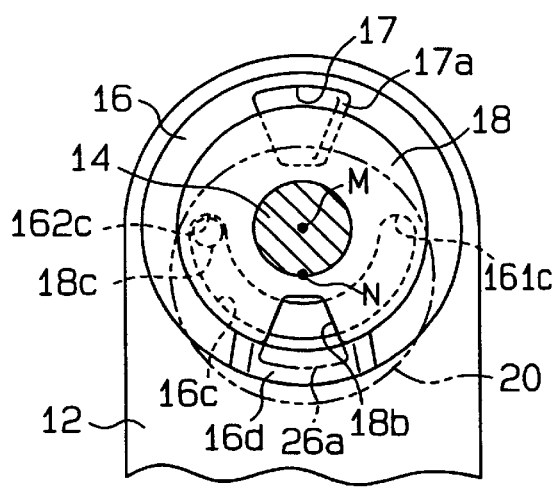

When the lower body 26a is released from the engagement recess 17, the lower end of the lower body 26a engages with the edge of the notch 18b, and this rotates the shutter plate 18 clockwise. When the shutter plate 18 rotates 180 degrees with the eccentric rotor 20 from the state of FIG. 4(a), the projection 18c abuts the second end 162c of the guide groove 16c as shown in FIG. 4(b). This prevents further rotation of the shutter plate 18 and retains the shutter plate 18 in the state shown in FIG. 4(b). In this state, the shutter plate 18 covers part of the engagement recess 17, and the notch 18b of the shutter plate 18 is radially aligned with the projection 16d of the connecting plate 16.

The lower body 26a rotates the shutter plate 18 and slides onto the projection 16d before reaching a position shown in FIG. 4(b). The thickness of the shutter plate 18 is slightly greater than the height of the projection 16d. Clockwise rotation of the shutter plate 18 shown in FIG. 4(b) is prevented. Therefore, the lower body 26a slides onto the shutter plate 18 and when it moves clockwise from the state shown in FIG. 4(b). Then, the lower end of the lower body 26a slides on the shutter plate 18, and the eccentric rotor 20 can rotate clockwise any number of times with respect to the connecting plate 16. The lower body 26a slides on the projection 16d when passing by the notch 18b, and the lower body 26a is prevented from entering the engagement recess 17 by the shutter plate 18. Since the difference between the height of the projection 16d and the thickness of the shutter plate 18 is small, there is no interference when the lower body 26a passes over the notch 18b.

The thickness of the shutter plate 18 is slightly greater than the height of the projection 16d. The shutter plate shown in FIG. 4(b) can rotate counterclockwise. Therefore, when the eccentric rotor 20 rotates counterclockwise from the state shown in FIG. 4(b), the lower end of the lower body 26a engages with the edge of the notch 18b and rotates the shutter plate 18 counterclockwise. After the shutter plate 18 rotates 180 degrees counterclockwise from the state of FIG. 4(b), the notch 18b is axially aligned with the engagement recess 17. Accordingly, the lower body 26a enters the engagement recess 17 due to the force of the coil spring 28.

Figure 5:
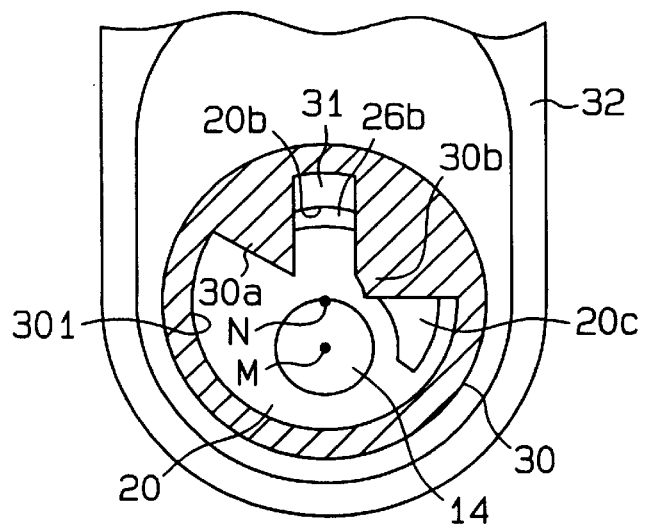
FIG. 5 is a cross-sectional view mainly showing a connecting portion of the connecting rod.

As shown in FIGS. 1 and 2, a socket 30 is provided on the proximal portion of the connecting rod 32. The socket 30 includes a cavity 301, which has a curved inner wall corresponding to the circumferential surface of the eccentric rotor 20. The eccentric rotor 20 is retained in the cavity 301 and can slide with respect to the socket 30. Accordingly, the connecting rod 32 pivots about the axis N of the eccentric rotor 20. As shown in FIG. 5, a pair of walls 30a, 30b are formed on the inside of the cavity 301, with a predetermined angle between them. The walls 30a, 30b contact the engagement projection 20c on the eccentric rotor 20. A slot 31 between the walls 30a, 30b retains the upper body 26b of the key 26.

When the eccentric rotor 20 is fixed to the connecting plate 16 by the lower body 26a, the upper body 26b is retracted in the eccentric rotor 20. In this state, the connecting rod 32 slides on the eccentric rotor 20 and is pivoted about the axis N of the eccentric rotor 20. The pivoting range is limited to the angular range between the abutment of one side of the engagement projection 20c of the eccentric rotor 20 to with the first wall 30a and the abutment of the other side of the projection 20 with the second wall 30b (see FIG. 5).

As shown in FIG. 5, when the projection 20c abuts against the second wall 30b, the upper body 26b is aligned with the slot 31, which is between the projections 30a, 30b. Accordingly, in this state, when the eccentric rotor is released from the connecting plate 16 by the movement of the lower body 26a, the upper body 26b enters the slot 31. In this state, the connecting rod 32 can pivot with the eccentric rotor 20 about the axis M of the shaft 14.

Figure 7:
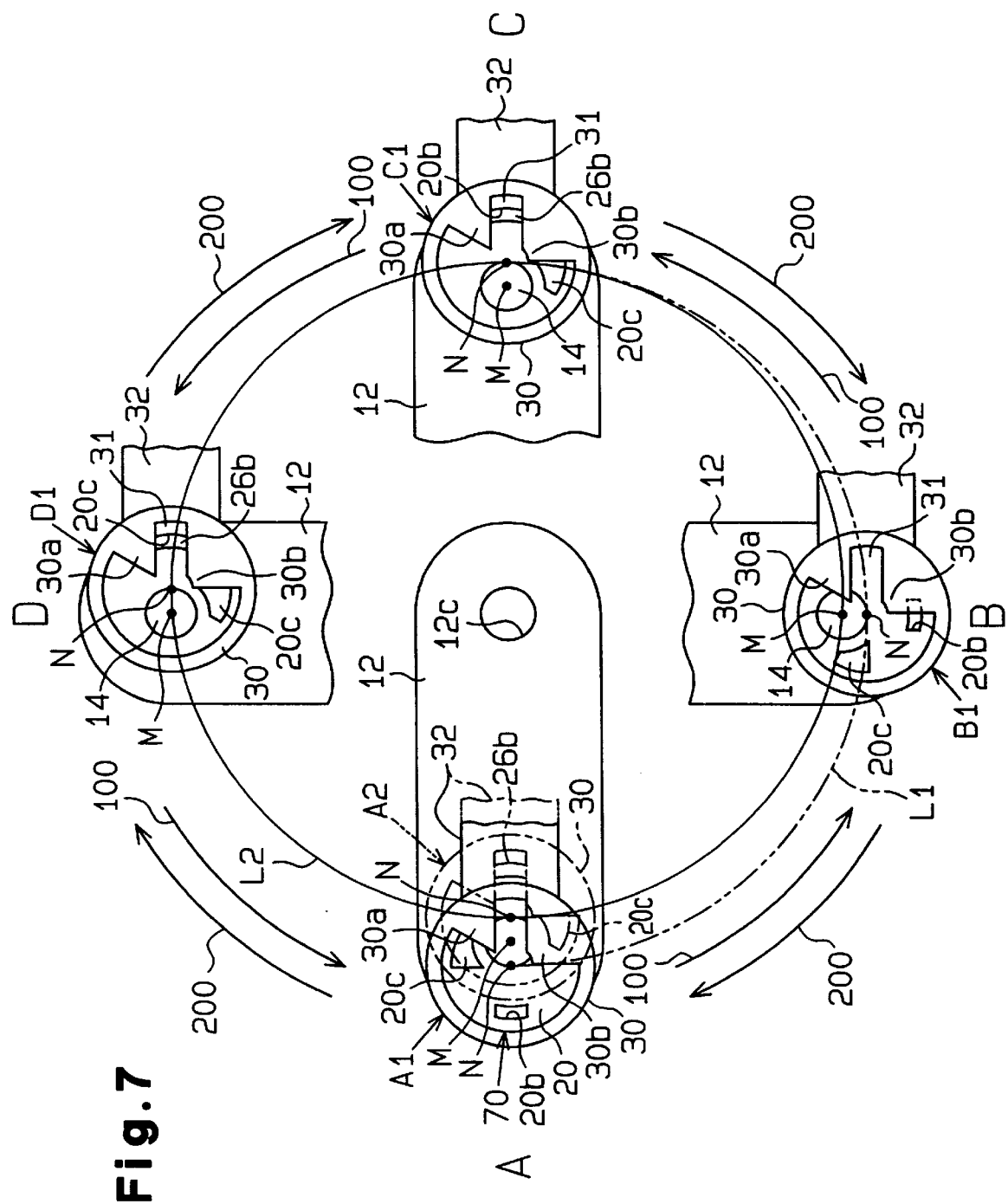
FIG. 7 is a diagram illustrating the operation of the wiper, showing, in particular, the positions of the crank, the eccentric rotor, and the connecting rod.
Figure 8:
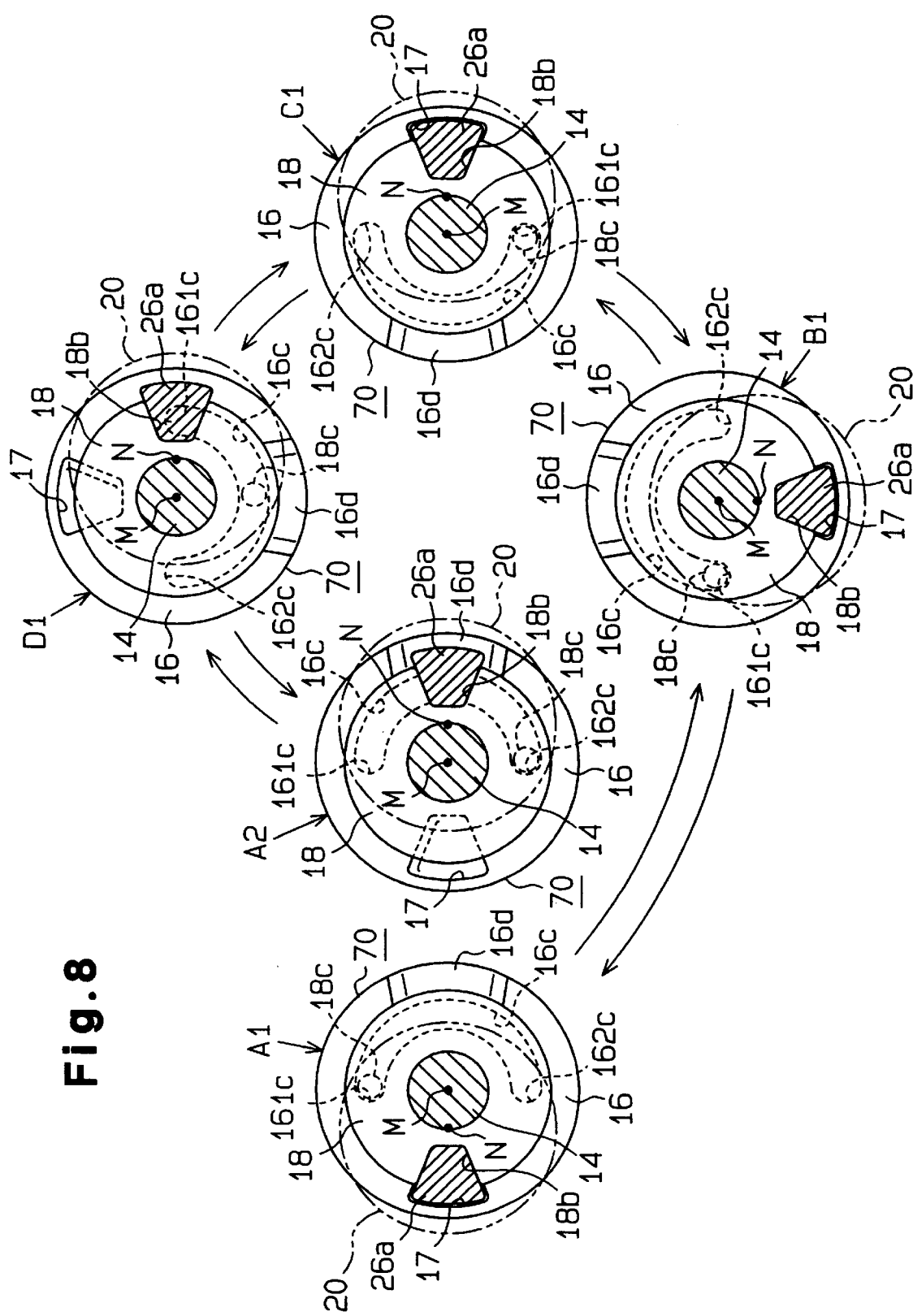
FIG. 8 is a diagram illustrating the operation of the wiper, showing, in particular, the positions of the connecting plate, the shutter plate, and the eccentric rotor.

Operation of the wiper mechanism 10 of the present embodiment will now be described. When the wiper mechanism 10 is not operating, the crank 12 is positioned at a datum position A shown in FIG. 7. In this position, the shifting mechanism 70 is in position A1 in FIGS. 7 and 8. FIG. 7 mainly shows the positions of the crank 12, the eccentric rotor 20, and the connecting rod 32. FIG. 8 shows the positions of the connecting plate 16, the shutter plate 18, and the eccentric rotor 20, in accordance with FIG. 7.

Figure 6A:
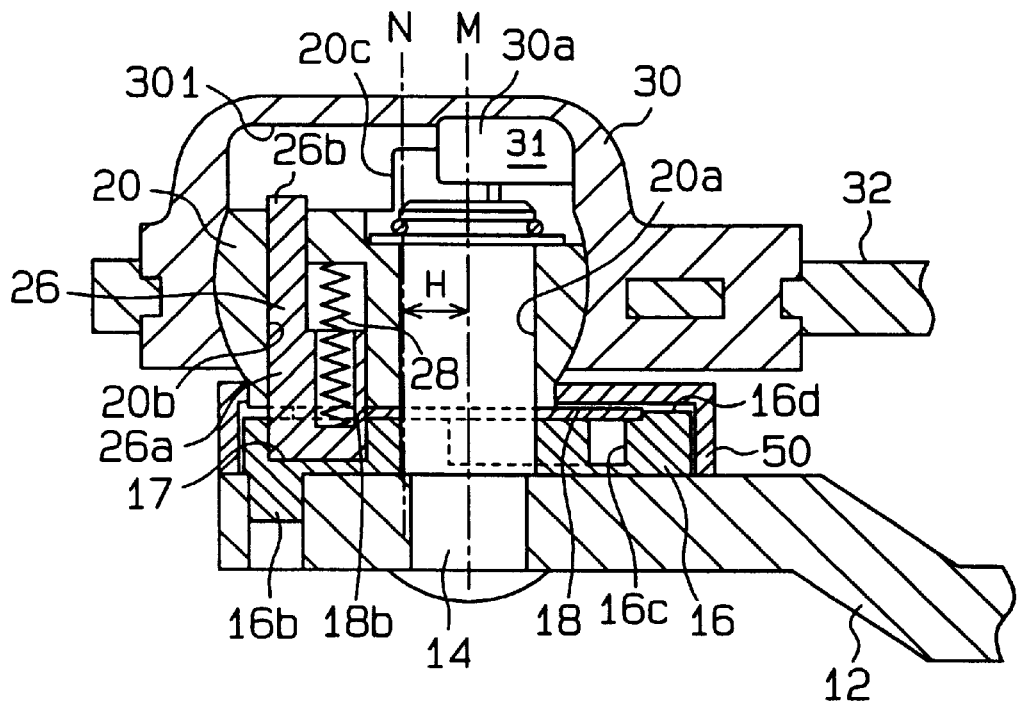
FIG. 6(*a*) is a partial cross-sectional view of the wiper when not operating.

The solid-line position A1 of the shift mechanism 70 shown in FIGS. 7 and 8 corresponds to the position shown in FIG. 6(a). In this state, the axis N of the eccentric rotor 20 is located on the distal side of the shaft 14, and the lower body 26a of the key 26 engages the engagement recess 17. Therefore, the eccentric rotor 20 is fixed to the crank 12 through the key 26 and the connecting plate 16, and pivoting of the connecting rod 32 with respect to the eccentric rotor 20 is permitted. As shown in FIG. 7, in the position labeled as A1, the engagement projection 20c of the eccentric rotor 20 abuts against the first wall 30a of the socket 30.

When the wiper mechanism 10 starts operating, the crank 12 rotates about the axis of the hole 12c in a counterclockwise direction 100 from the datum position shown by A in FIG. 7. This rotation is defined as normal rotation. During normal rotation of the crank 12, the eccentric rotor 20 is fixed to the crank 12 and rotates counterclockwise with respect to the connecting rod 32. In other words, the connecting rod 32 rotates clockwise with respect to the eccentric rotor 20 about the axis N.

Therefore, as shown in FIG. 7, as the crank 12 rotates from the datum position A to a position C by way of a position B, the engagement projection 20c of the eccentric rotor 20 gradually moves away from the first wall 30a and forwards the second wall 30b. The path of the axis N of the eccentric rotor 20 is labeled as L1. When the crank 12 is at the position C, the engagement projection 20c abuts against the second wall 30b. In this state, the upper body 26b, which is in the eccentric rotor 20, is axially aligned with the slot 31.

As shown by A1, B1, C1 in FIG. 8, while the crank 12 rotates 180 degrees from the datum position A to the position C, the connecting plate 16, the shutter plate 18 and the eccentric rotor 20 move with the crank 12, and their relative positions remain unchanged.

The position of the shift mechanism 70 labeled C1 in FIGS. 7 and 8 corresponds to the state shown in FIG. 1(a). When the crank 12 rotates further in the direction 100, the engagement projection 20c abuts the second wall 30b and further counterclockwise rotation of the eccentric rotor 20 with respect to the connecting rod 32 is prevented. This generates a force that rotates the eccentric rotor 20 and the connecting rod 32 about the shaft 14, clockwise with respect to the crank 12. Therefore, the lower body 26a is forced from the engagement recess 17 onto the connecting plate 16. Accordingly, rotation of the eccentric rotor 20 about the axis M with respect to the connecting plate 16 and the crank 12 is permitted. Further, when the lower body 26a is released from the engagement recess 17, the upper body 26b projects from the eccentric rotor 20 into the slot 31. This locks the connecting rod 32 to the eccentric rotor 20.

While the crank 12 is rotated from the position C to the datum position A via the position D, the eccentric rotor 20 and the connecting rod 32 rotates about the axis M of the shaft 14, clockwise with respect to the crank 12. The path of the axis N of the eccentric rotor 20 is labeled as L2. The position of the shift mechanism 70 labeled as D1 in FIGS. 7 and 8 corresponds to the state shown in FIG. 1(b). As shown in FIG. 1(b), the lower body 26a engages the edge of the notch 18 when exiting from the engagement recess 17, and the shutter plate 18 thus rotates with the eccentric rotor 20 and the connecting rod 32 with respect to the connecting plate 16.

Figure 6B:
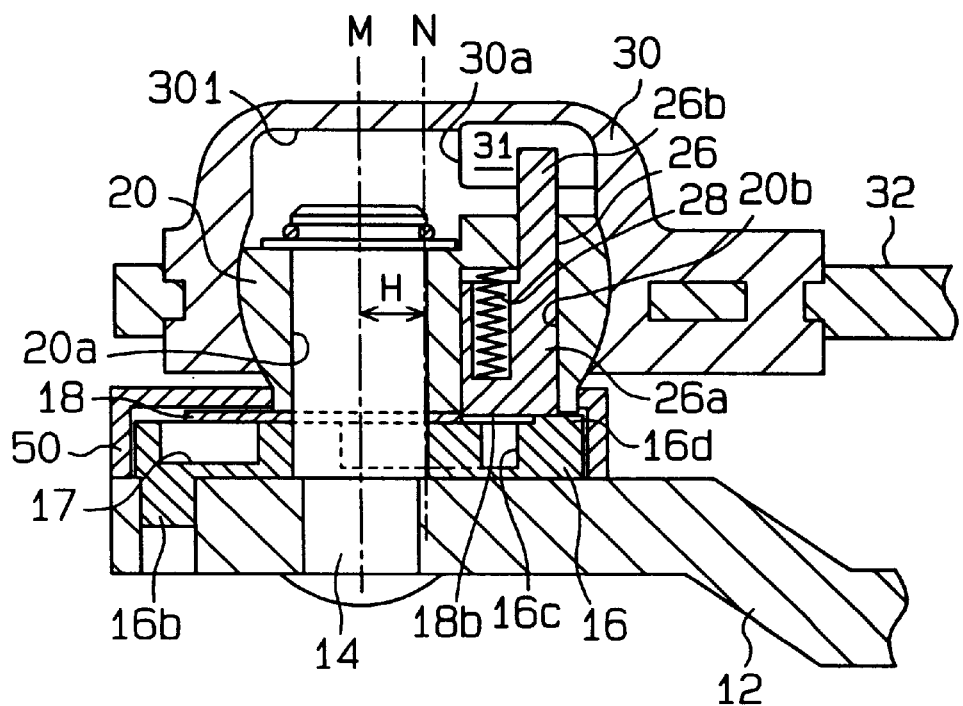

When the crank 12 is returned to the datum position A in FIG. 7, the shift mechanism 70 is in the broken-line position A2 in FIGS. 7 and 8, which corresponds to the state shown in FIG. 6(b). In this state, the axis N of the eccentric rotor 20 is located on the proximal side of the axis M. Accordingly, compared to when the wiper mechanism 10 is not operating, or when the shift mechanism 70 is in the solid-line state A1, the axis N of the eccentric rotor 20 is nearer to the axis of the crank 12 by the distance 2 H. Therefore, the socket 30 of the connecting rod 32 is pushed further toward a link lever 40 shown in FIG. 10 by the distance 2 H, compared to when the wiper mechanism 10 is not operating.

As shown in FIG. 8, while moving from the state C1 to the state A2 via the state D1, the eccentric rotor 20 and the shutter plate 18 rotate 180 degrees with respect to the connecting plate 16. In the state A2 shown in FIG. 8, the projection 18c of the shutter plate 18 abuts against the second end 162c of the guide groove 16c. Therefore, after this, when the crank 12 rotates in the normal direction 100 shown in FIG. 7, the position of the shutter plate 18 relative to the connecting plate 16 does not change. In other words, the engagement recess 17 remains covered by the shutter plate 18, and the lower body 26a is prevented from entering the engagement recess 17.

Figure 9:
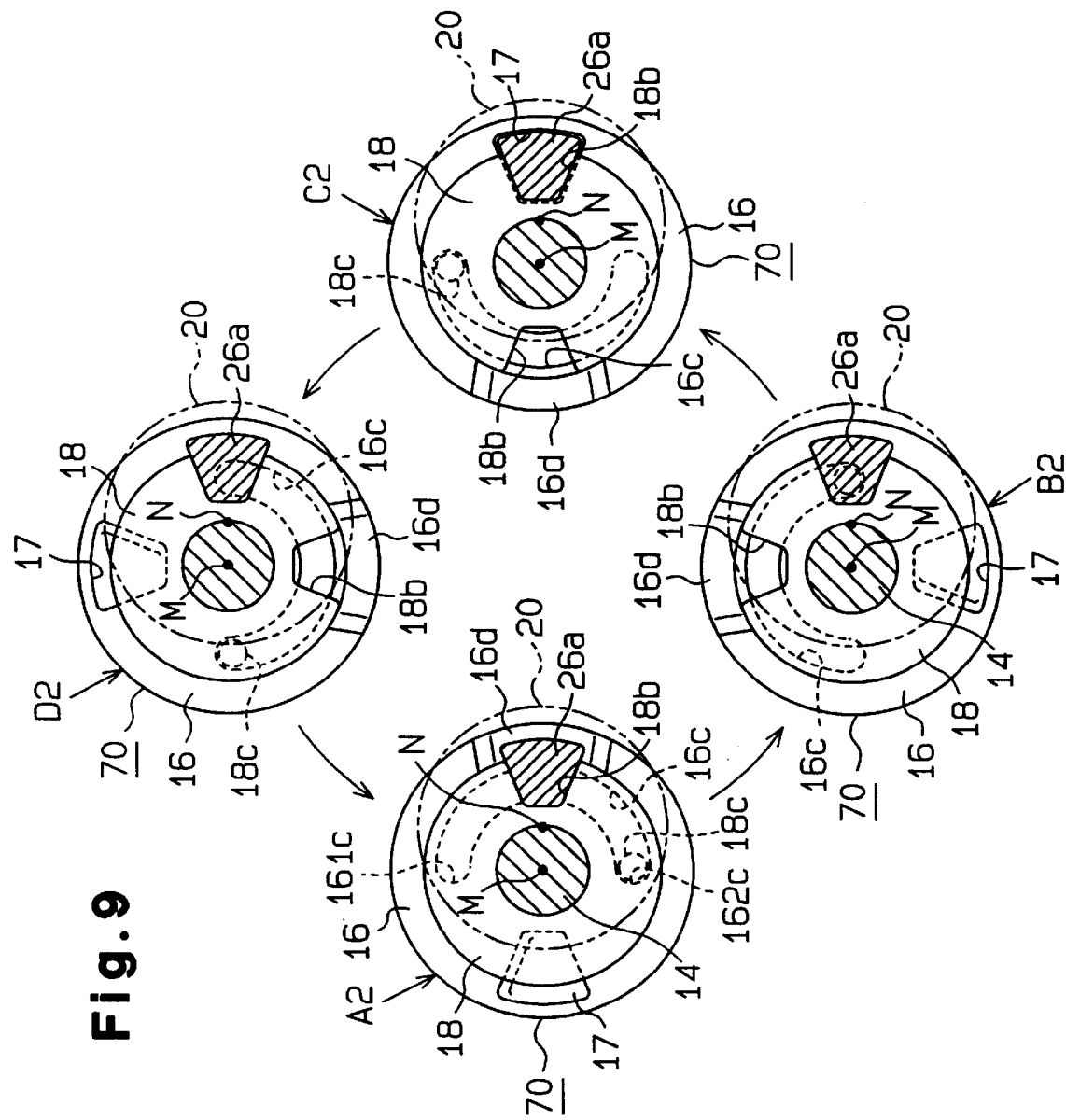
FIG. 9 is a diagram illustrating the operation of the wiper, showing, in particular, the positions of the connecting plate, the shutter plate, and the eccentric rotor.

FIG. 9 shows the states A2–D2 of the shift mechanism 70 when the crank 12 is positioned at each position A–D shown in FIG. 7 after the crank 12 has made a first rotation since it started operation. The state A2 in FIG. 9 is the same as the state A2 in FIG. 8. As shown in FIG. 9, as long as the crank 12 continues to rotate in the direction 100 in FIG. 7 after the first rotation, the lower end of the lower body 26a slides over the shutter plate 18 and rotates about the shaft 14 with the eccentric rotor 20 and the connecting rod 32 with respect to the crank 12. During this time, the axis N of the eccentric rotor 20 moves on the path L2 shown in FIG. 7.

In the state A2 in FIGS. 8, 9 and FIG. 6(b), the notch 18b of the shutter plate 18 is radially aligned with the projection 16d on the connecting plate 16. Accordingly, when passing over the notch 18b, the lower body 26a slides on the projection 16d. Without the projection 16d, noise and vibration would be generated. This is because the lower body 26a would move axially by a distance equal to the thickness of the shutter plate 18 when passing over the notch 18b. In the present embodiment, the projection 16d is slightly lower than the top of the shutter plate 18. Furthermore, the ends of the projection 16d are gently inclined. This prevents noise and vibration, and the eccentric rotor 20 rotates smoothly with respect to the connecting plate 16 and the shutter plate 18.

When the wiper mechanism 10 is stopped, the crank 12 first rotates in the normal direction 100 to the datum position A of FIG. 7. Then, the crank 12 makes one rotation in the reverse direction 200 of FIG. 7 and returns to the datum position A. While the crank 12 makes one rotation in the reverse direction 200, the movement of the crank 12 is opposite to that described earlier. That is, when the crank 12 rotates from the datum position A to the position D and to the position C as shown in FIG. 7, the shift mechanism 70 moves from the state A2 to the state D1 and then to the state C1 as shown in FIGS. 7 and 8.

As shown in FIG. 8, from state A2 to state C1, the eccentric rotor 20 rotates 180 degrees with the shutter plate 18 with respect to the connecting plate 16. In the state C1 shown in FIG. 8, the projection 18c of the shutter plate 18 abuts against the first end 161c of the guide groove 16c, and the notch 18b is axially aligned with the engagement recess 17. Accordingly, the lower body 26a enters the engagement recess 17 and the upper body 26d is released from the slot 31. That is, the eccentric rotor 20 is fixed to the crank 12 and can rotate with respect to the connecting rod 32.

Therefore, when the crank 12 pivots from the position C to the datum position A via the position B, the shift mechanism 70 varies from the state C1 to the state A1 via the state B1 as shown in FIGS. 7 and 8. In this motion, the eccentric rotor 20 moves integrally with the crank 12 and rotates counterclockwise with respect to the connecting rod 32. Accordingly, the engagement projection 20c on the eccentric rotor 20 gradually moves away from the second wall 30b. The axis N of the eccentric rotor 20 moves along the path L1.

The operation of the wiper mechanism 10 will now be described with reference to FIG. 10. When the wiper mechanism 10 is not operating, the crank 12 is positioned at the datum position A, and the eccentric rotor 20 is at the position A1. In this state, the joint between the connecting rod 32 and the link lever 40 is located at a position A1' and the wiper blade 44 is at the storage position A1", which is below the wiping range R.

When the operation of the wiper mechanism 10 is started, the crank 12 makes a normal rotation, or a counterclockwise rotation. While the crank 12 rotates from the datum position A to the position C, the eccentric rotor 20 is fixed to the crank 12, and its axis N moves along the path L1. This is accompanied by the movement of the joint between the connecting rod 32 and the link lever 40, from the position A1' to the position C'. The wiper blade 44 moves from the storage position A1" to the upper limit position C" of the wiping range R.

When the crank 12 passes by the position C, the eccentric rotor 20 is released from the crank 12 and the connecting rod 32 is fixed to the eccentric rotor 20. This state is maintained as long as the crank 12 continues normal rotation in the counterclockwise direction. Accordingly, with the normal rotation (counterclockwise in FIG. 10) of the crank 12, the eccentric rotor 20 and the connecting rod 32 rotate about the shaft 14 with respect to the crank 12 and the axis N of the eccentric rotor 20 moves on the path L2. In other words, the normal rotation of the crank 12 shifts the pivot axis N of the connecting rod 32 closer to the rotational axis of the crank 12.

When the crank 12 returns to the datum position A, the eccentric rotor 20 is in the broken-line position A2. In this state, the connecting rod 32 is positioned closer to the link lever 40 by the distance 2 H, compared to when the eccentric rotor 20 is in the solid-line state A1, or when the wiper mechanism 10 is not operating. Therefore, the joint between the connecting rod 32 and the link lever 40 is in the position labeled A2', and the wiper blade 44 is located at the lower limit position A2" of the wiping range R.

As long as the crank 12 rotates counterclockwise, the axis N of the eccentric rotor 20 moves on the path L2 and the wiper blade 44 pivots between the lower limit position A2" of the wiping range R and the upper limit position C".

When the operation of the wiper mechanism 10 is stopped, the crank 12 makes one reverse rotation clockwise from the datum position A to the datum position A. While the crank 12 returns to the datum position from the position C, the axis N of the eccentric rotor 20 moves along the path L1. That is, reverse rotation of the crank 12 moves the pivot axis N in the distal direction of the crank 12. This moves the wiper blade 44 from the upper limit position C" of the wiping range R to the storage position A1".

In the wiper mechanism 10 of the present embodiment, the key 26 connects the eccentric rotor 20 either to the crank 12 or to the connecting rod 32. This shifts the position of the wiper blade 44 between the wiping range R and the storage position A1".

Therefore, compared to the prior art wiper of FIG. 31, the number of parts is reduced and the construction and operation of the key 26 is simplified. This lowers the manufacturing cost and the operation of the wiper becomes more reliable.

The engagement of the engagement projection 20c of the eccentric rotor 20 with the second wall 30b of the socket 30 generates a force that releases the key 26 from the engagement recess 17. Furthermore, when the engagement projection 20c abuts the second wall 30b, the position of the key 26 is precisely determined by the slot 31 of the socket 30. Therefore, the key 26 is released from the engagement recess 17 with a predetermined timing and is positioned in the slot 31 with a predetermined timing. The simple structure of the engagement projection 20c and the second wall 30b ensures the proper operation of the key 26.

When the wiper mechanism 10 is operating, or when the crank 12 is normally rotating, the shutter 18 continues to cover the engagement recess 17. This prevents the key 26 from entering the engagement recess 17 during normal rotation of the crank 12. This ensures normal operation of the wiper mechanism 10.

The projection 16d of the connecting plate 16 facilitates passage of the key 26 over the notch 18b of the shutter plate 18, and this prevents the generation of noise and vibration. Generally, a lubricant like grease is applied to the sliding parts of the shift mechanism 70. If the key 26 moved up and down by a significant amount when passing over the notch 18b, the lubricant would be splattered. This is prevented in the present embodiment.

When the operation of the wiper mechanism 10 is stopped, the rotation of the eccentric rotor 20 with respect to the connecting plate 16 moves the shutter 18 until the notch 18b is axially aligned with the engagement recess 17. Therefore, the reverse rotation of the crank 12 causes the key 26 to enter the engagement recess 17.

Since the connecting plate 16 and the shutter plate 18 are covered by the cover 50, dust is sealed out and lubrication is sealed in. This further ensures reliability of the shift mechanism 70.

Figure 11:
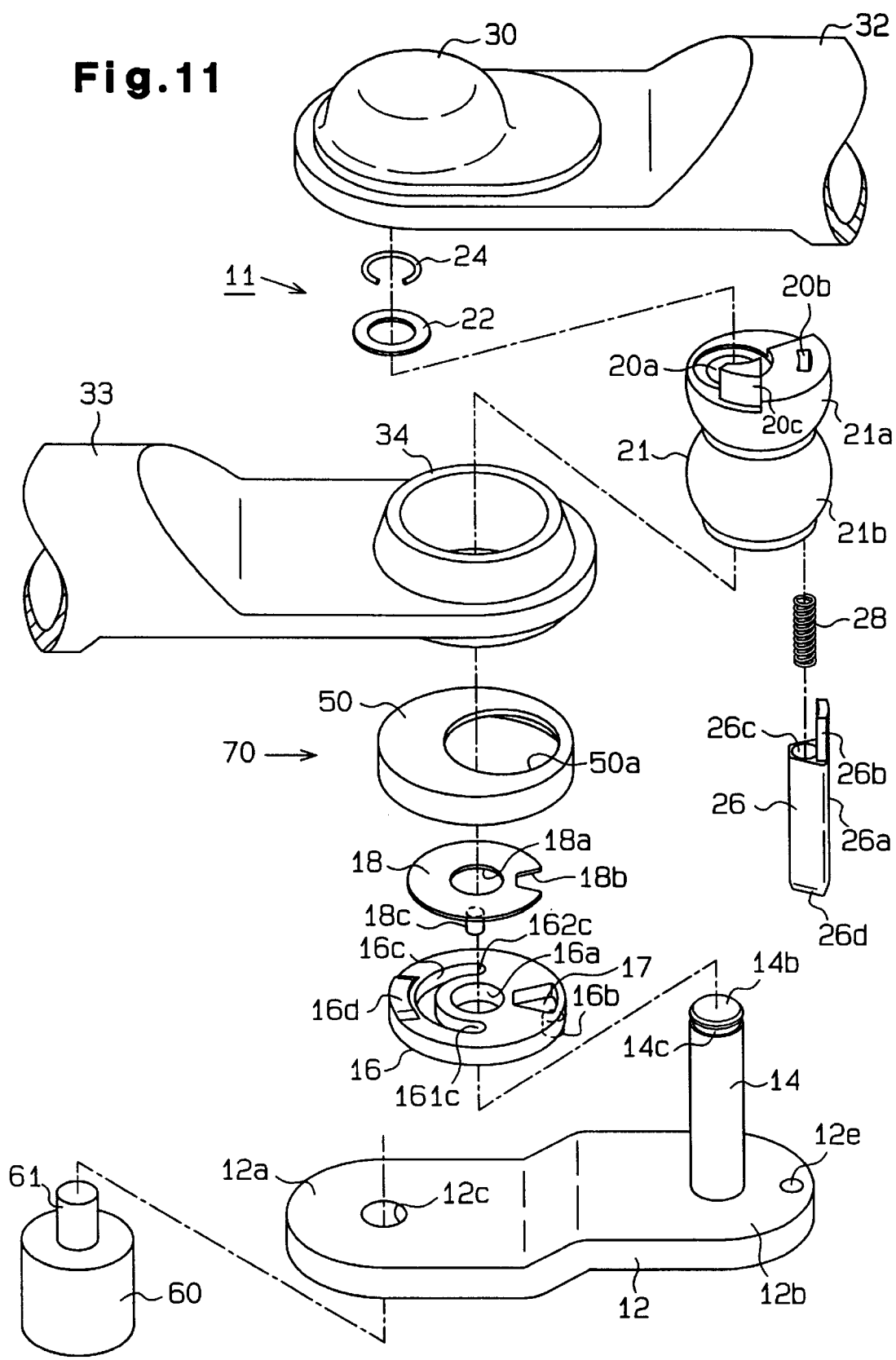
FIG. 11 is an exploded perspective view of a wiper joint according to a second embodiment of the present invention.
Figure 12:
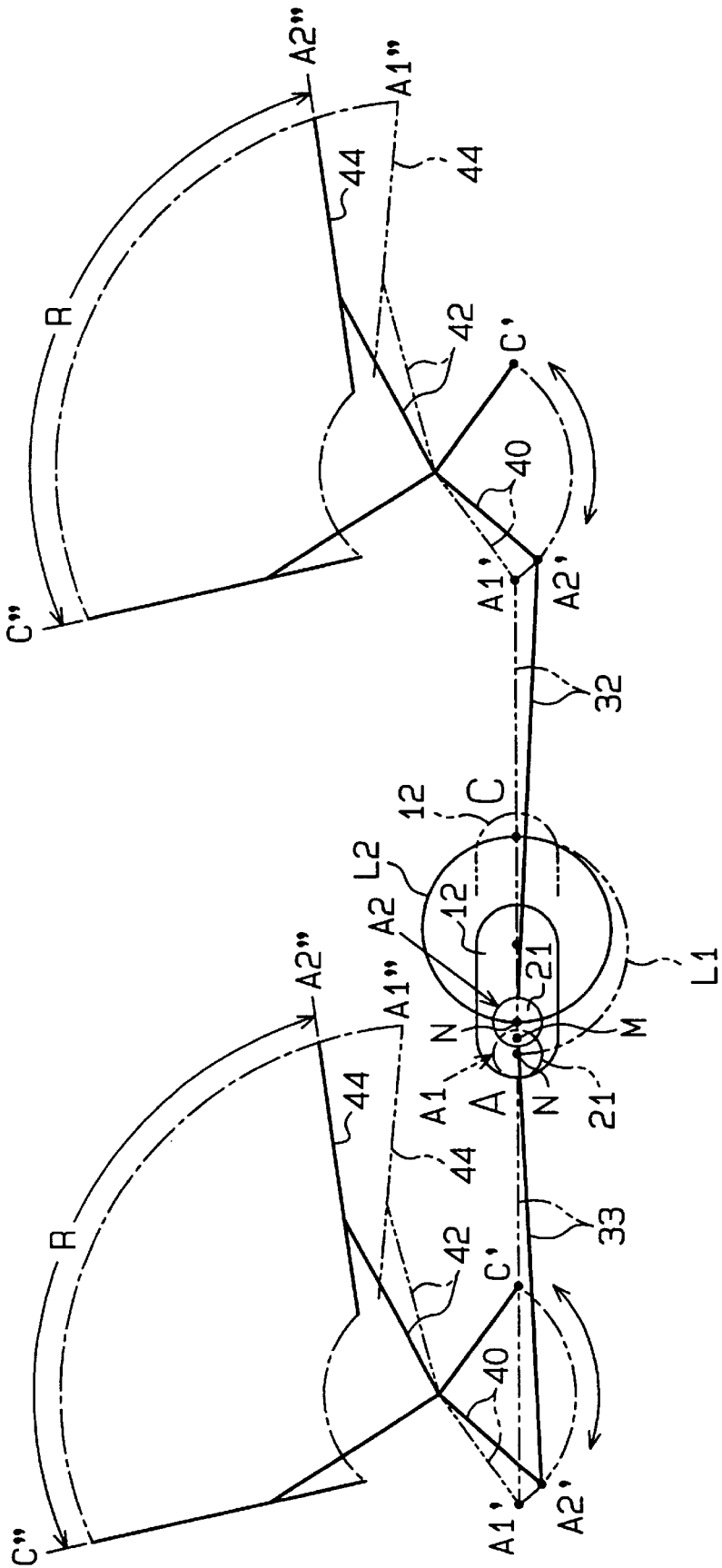
FIG. 12 is a motion diagram of a wiper mechanism including the joint of FIG. 11.

A second embodiment of the present invention will now be described concentrating on the differences from the first embodiment. FIGS. 11 and 12 show a double-type wiper 11 according to the second embodiment. As shown in FIG. 12, the wiper 11 includes a pair of connecting rods 32, 33, which are connected to an eccentric rotor 21. Each connecting rod 32, 33 extends from the eccentric rotor in opposite directions from one another. Each distal end of the connecting rods 32, 33 is connected to the associated wiper arm 42 through a link lever 40 as in the wiper mechanism 10 of FIG. 10. Each wiper arm 42 supports a corresponding wiper blade 44.

As shown in FIG. 11, an eccentric rotor 21 of the second embodiment has two spherical elements. That is, the eccentric rotor 21 includes a first spherical element 21a corresponding to the eccentric rotor of 20 of FIG. 2 and a second spherical element 21b, which is connected to the lower end of the first element 21a. The eccentric rotor 21 further includes the through hole 20a for receiving the shaft 14, a guide hole 20b for receiving the key 26, and an engagement projection 20c.

The eccentric rotor 21 of the second embodiment is longer than the eccentric rotor 20 shown in FIG. 2 by the length of the second element 21b. In accordance with this, the axial lengths of the lower body 26a of the key 26 and the shaft 14 is greater than that shown in FIG. 2.

One connecting rod 32 is the same as that shown in FIG. 2 and is fitted on the first element 21a. A joint 34 is provided at the proximal end of the other connecting rod 33. The socket 34 is slidably fitted on the second element 21b.

The operation of the wiper 11 of the present invention is similar to that of the wiper mechanism 10 shown in FIG. 2. When the wiper 11 is operating, the motor 60 rotates the crank 12 in the normal direction. Each connecting rod 32, 33 converts the rotation of the crank 12 into a pivotal movement of the corresponding link lever 40. With the pivotal movement of each link lever 40, the wiper arms 42 pivots the corresponding wiper blade 44 in the wiping range R. When the wiper 11 is not operating, as shown by a broken line in FIG. 12, the wiper blades 44 are placed at the storage position A1" below the wiping range R by the operation of the shift mechanism 70.

In the double wiper 11 of FIG. 12, two connecting rods 32, 33 extend in opposite directions, with one crank 12 in the center. In other words, the mechanism for driving two wiper blades 44 is provided on both sides of one crank 12. In this way, the size of the wiper mechanism 11 is reduced compared to a structure in which the mechanism for driving two wiper blades is provided on only one side of the crank or a structure in which a link lever is connected to the distal end of one connecting rod extending from the crank, and another connecting rod for driving another link lever is connected to the distal end of the connecting rod. Since the length of each connecting rod 32, 33 is half of the distance between the link levers 40, the amount of material for the connecting rods 32, 33 is reduced.

The wiper according to the present invention can be applied to ships and aircraft in addition to automobiles.

Therefore, the present examples and embodiments are to be considered as illustrative and not restrictive and the invention is not to be limited to the details given herein, but may be modified within the scope and equivalence of the appended claims.

What is claimed is:

1. A wiper mechanism comprising:

a crank, which is rotatable about a crank axis;

a rod for transmitting motion from the crank to a wiper arm, which supports a wiper blade, the rod having a crank end and a wiper end, the crank end being connected to the crank, wherein the axis about which the crank end of the rod pivots is a rod pivot axis;

a joint located between the crank and the rod, wherein the joint includes a shift mechanism for changing the axis about which the rod pivots with respect to the crank, the shift mechanism comprising:

a shaft supported by the crank, wherein the axis of the shaft is parallel to the crank axis;

an eccentric rotor, which is supported on the shaft to eccentrically rotate about the axis of the shaft, wherein the eccentric rotor has a center axis that is offset from the axis of the shaft, wherein a socket is formed on the crank end of the rod to fit on and rotate with respect to the eccentric rotor, wherein the socket includes an opening and a wall;

a connecting plate fixed to the crank, wherein the connecting plate includes an opening;

a key for selectively locking either the crank or the rod to the eccentric rotor, wherein the key is operated by the rotation of the crank, and wherein the key enters the opening of the rod to lock the eccentric rotor to the rod when the crank rotates in a first direction and the key enters the opening of the connecting plate to lock the eccentric rotor to the crank when the crank rotates in a second direction, which is opposite to the first direction, wherein the axis of rotation between the rod and the crank coincides with the axis of the shaft when the eccentric rotor is locked to the rod, and the axis of rotation between the rod and the crank coincides with the center axis of the eccentric rotor when the eccentric rotor is locked to the crank; and an engaging projection formed on the eccentric rotor, wherein, when the crank rotates in one direction by a predetermined angle while the key is received in the opening of the connecting plate, the engaging projection engages the wall of the socket, which generates a force that rotates the eccentric rotor with respect to the connecting plate to move the key out of the opening of the connecting plate.

2. The wiper mechanism according to claim 1, wherein the wiper blade pivots in a wiping range during continuous rotation of the crank in the first direction, wherein the crank stops at predetermined datum position after it rotates by a predetermined angle in the second direction, wherein the wiper blade is positioned in a storage position when the crank stops at the datum position.

3. The wiper mechanism according to claim 1, wherein the center axis of the eccentric rotor is located between the shaft and the crank axis when the crank passes by the datum position while rotating in the first direction.

4. The wiper mechanism according to claim 2, wherein the key locks the eccentric rotor to the rod when the crank first passes by a position 180 degrees from the datum position during its rotation in the first direction, and the key locks the eccentric rotor to the crank when the crank passes by a position 180 degrees from the datum position during its rotation in the second direction.

5. The wiper mechanism according to claim 1, wherein the key is supported by the eccentric rotor to move axially, the key including a first end and a second end, wherein the first end can project from the eccentric rotor toward the connecting plate, and the second end can project from the eccentric rotor toward the socket.

6. The wiper mechanism according to claim 5, wherein the eccentric rotor includes a through hole for supporting the key, the axial length of the key being greater than the axial length of the through hole.

7. The wiper mechanism according to claim 5, wherein at least one of the first end of the key and the opening of the connecting plate includes a cam surface that serves to force the key from the opening of the connecting plate.

8. The wiper mechanism according to claim 5, wherein the second end of the key is axially aligned with the opening of the socket when the engaging projection engages with the wall.

9. The wiper mechanism according to claim 5, wherein the shift mechanism further includes a shutter located between the connecting plate and the eccentric rotor, wherein the shutter can rotate about the shaft with respect to the connecting plate, wherein the shutter includes an opening corresponding to the opening of the connecting plate, wherein the shutter permits the entry of the first end of the key into the opening of the connecting plate when the opening of the shutter is axially aligned with the opening of the connecting plate, and the shutter prevents the entry of the first end of the key into the opening of the connecting plate when the opening of the shutter is misaligned with the opening of the connecting plate.

10. The wiper mechanism according to claim 9, wherein the shutter can rotate with respect to the connecting plate between a first limit position and a second limit position, the first limit position being angularly spaced from the second limit position by a predetermined angle, wherein the opening of the shutter is axially aligned with the opening of the connecting plate when the shutter is at the first limit position.

11. The wiper mechanism according to claim 10, wherein the shutter is engaged by and moved between the first limit position and the second limit position by the first end of the key.

12. The wiper mechanism according to claim 10, wherein the connecting plate includes a guide surface for guiding the first end of the key, wherein the guide surface is radially aligned with the opening of the shutter when the shutter is at the second limit position, wherein the guide surface projects in the axial direction from the connecting plate, and the shutter is closer to the eccentric rotor in the axial direction than the guide surface.

13. The wiper mechanism according to claim 1, wherein a said rod is a first rod, and a second rod is connected to the eccentric rotor to rotate about the center axis of the eccentric rotor, wherein the second rod extends in a direction that is generally opposite to that of the first rod, and the eccentric rotor is located between the first and second rods, wherein the second rod converts the rotation of the crank into pivoting of another wiper arm, which supports another wiper blade.

14. A wiper mechanism comprising:

a crank, which is rotatable about a crank axis;

a rod for transmitting motion from the crank to a wiper arm, which supports a wiper blade, the rod having a crank end and a wiper end, the crank end being connected to the crank, wherein the axis about which the crank end of the rod pivots is a rod pivot axis;

a joint located between the crank and the rod, wherein the joint includes a shift mechanism for changing the axis about which the rod pivots with respect to the crank, the shift mechanism comprising:

a shaft supported by the crank, wherein the axis of the shaft is parallel to the crank axis;

an eccentric rotor, which is supported on the shaft to eccentrically rotate about the axis of the shaft, wherein the eccentric rotor has a center axis that is offset from the axis of the shaft;

a connecting plate, which is fixed to the crank;

a key for selectively locking either the crank or the rod to the eccentric rotor, the key being supported by the eccentric rotor to move in the axial direction of the eccentric rotor, wherein the key is operated by the rotation of the crank, and wherein the key enters an opening on the rod to lock the eccentric rotor to the rod when the crank rotates in a first direction and the key enters an opening in the connecting plate to lock the eccentric rotor to the crank when the crank rotates in a second direction, which is opposite to the first direction, wherein the axis of rotation between the rod and the crank coincides with the axis of the shaft when the eccentric rotor is locked to the rod, and the axis of rotation between the rod and the crank coincides with the center axis of the eccentric rotor when the eccentric rotor is locked to the crank;

an engaging projection formed on the eccentric rotor wherein when the crank rotates in one direction by a predetermined angle while the key is received in the opening of the connecting plate, the engaging projection engages a wall formed on the rod, which generates a force that rotates the eccentric rotor with respect to the connecting plate to move the key out of the opening of the connecting plate; and a shutter, which is located between the connecting plate and the eccentric rotor, wherein the shutter can rotate about the shaft with respect to the connecting plate, the shutter including an opening corresponding to the opening of the connecting plate, wherein the shutter permits the entry of the key into the opening of the connecting plate when the opening of the shutter is axially aligned with the opening of the connecting plate, and the shutter otherwise prevents the entry of the key into the opening of the connecting plate when the opening of the shutter is misaligned with the opening of the connecting plate.

15. The wiper mechanism according to claim 14, wherein the wiper blade pivots in a wiping range during continuous rotation of the crank in the first direction, wherein the crank stops at a predetermined datum position after it rotates by a predetermined angle in the second direction, wherein the wiper blade is positioned in a storage position when the crank stops at the datum position.

16. The wiper mechanism according to claim 14, wherein the eccentric rotor includes a through hole for supporting the key, the axial length of the key being greater than the axial length of the through hole.

17. The wiper mechanism according to claim 14, wherein at least one of the key and the opening of the connecting plate includes a cam surface that serves to force the key from the opening of the connecting plate.

18. The wiper mechanism according to claim 14, wherein the key is axially aligned with the opening of the rod when the engaging projection engages with the wall.

19. A wiper mechanism comprising:
a crank, which is rotatable about a crank axis;
a rod for transmitting motion from the crank to a wiper arm, which supports a wiper blade, the rod having a crank end and a wiper end, the crank end being connected to the crank, wherein the axis about which the crank end of the rod pivots is a rod pivot axis;
a joint located between the crank and the rod, wherein the joint includes a shift mechanism for changing the axis about which the rod pivots with respect to the crank, the shift mechanism comprising:
a shaft supported by the crank, wherein the axis of the shaft is parallel to the crank axis;
an eccentric rotor supported on the shaft to eccentrically rotate about the axis of the shaft, wherein the eccentric rotor has a center axis that is offset from the axis of the shaft;
a connecting plate fixed to the crank;
a key for selectively locking either the crank or the rod to the eccentric rotor, wherein the key is operated by the rotation of the crank, and wherein the key enters an opening of the rod to lock the eccentric rotor to the rod when the crank rotates in a first direction and the key enters an opening of the connecting plate to lock the eccentric rotor to the crank when the crank rotates in a second direction, which is opposite to the first direction, wherein the axis of rotation between the rod and the crank coincides with the axis of the shaft when the eccentric rotor is locked to the rod, and the axis of rotation between the rod and the crank coincides with the center axis of the eccentric rotor when the eccentric rotor is locked to the crank; and
a shutter located between the connecting plate and the eccentric rotor, wherein the shutter can rotate about the shaft with respect to the connecting plate between a first limit position and a second limit position, the first limit position being angularly spaced from the second limit position by a predetermined angle, the shutter including an opening corresponding to the opening of the connecting plate, wherein, when the shutter is at the first limit position, the opening of the shutter is axially aligned with the opening of the connecting plate to permit the entry of the key into the opening of the connecting plate, and when the shutter is at a position other than the first limit position, the opening of the shutter is misaligned with the opening of the connecting plate to prevent the entry of the key into the opening of the connecting plate.

20. The wiper mechanism according to claim 19, wherein the shutter is engaged by and moved between the first limit position and the second limit position by the first end of the key.

* * * * *